May 14, 1929.　　　S. RUBIN　　　1,713,484
AUTOMOBILE FENDER
Filed Aug. 3, 1928　　3 Sheets-Sheet 1
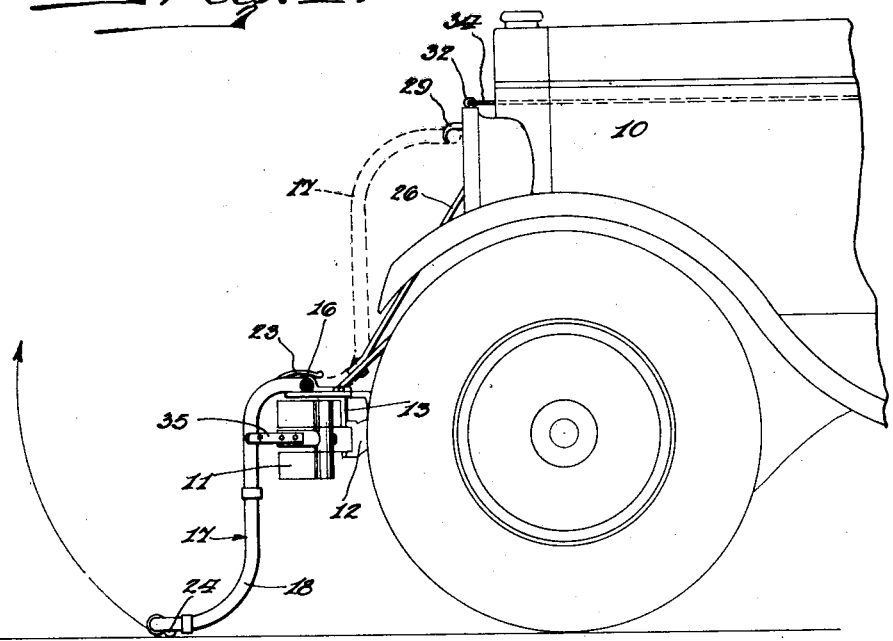
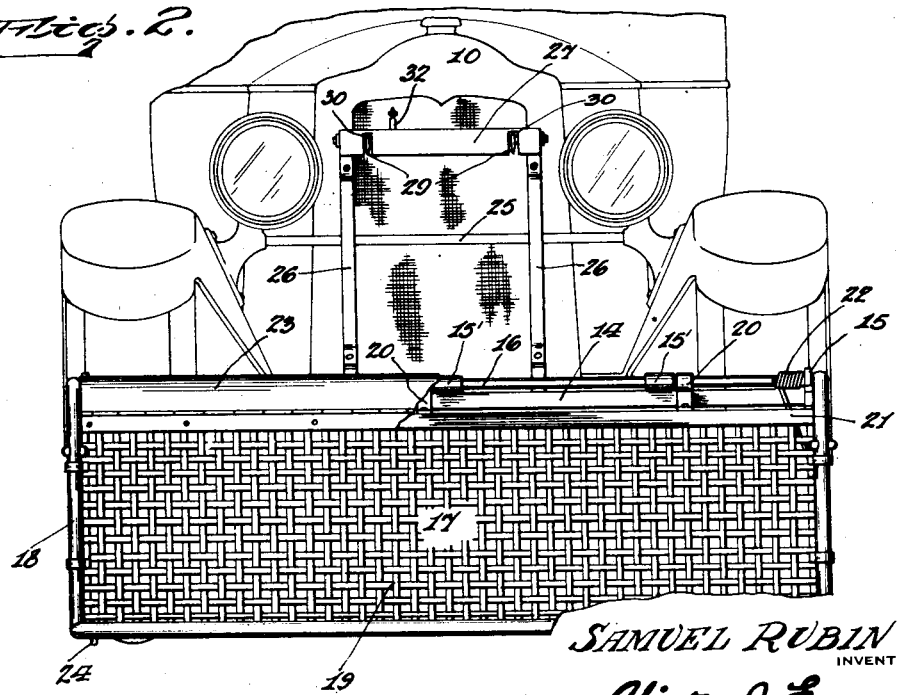
SAMUEL RUBIN
INVENTOR
BY Victor J. Evans
ATTORNEY
WITNESS:

May 14, 1929.                S. RUBIN                  1,713,484
                         AUTOMOBILE FENDER
                       Filed Aug. 3, 1928      3 Sheets-Sheet 2
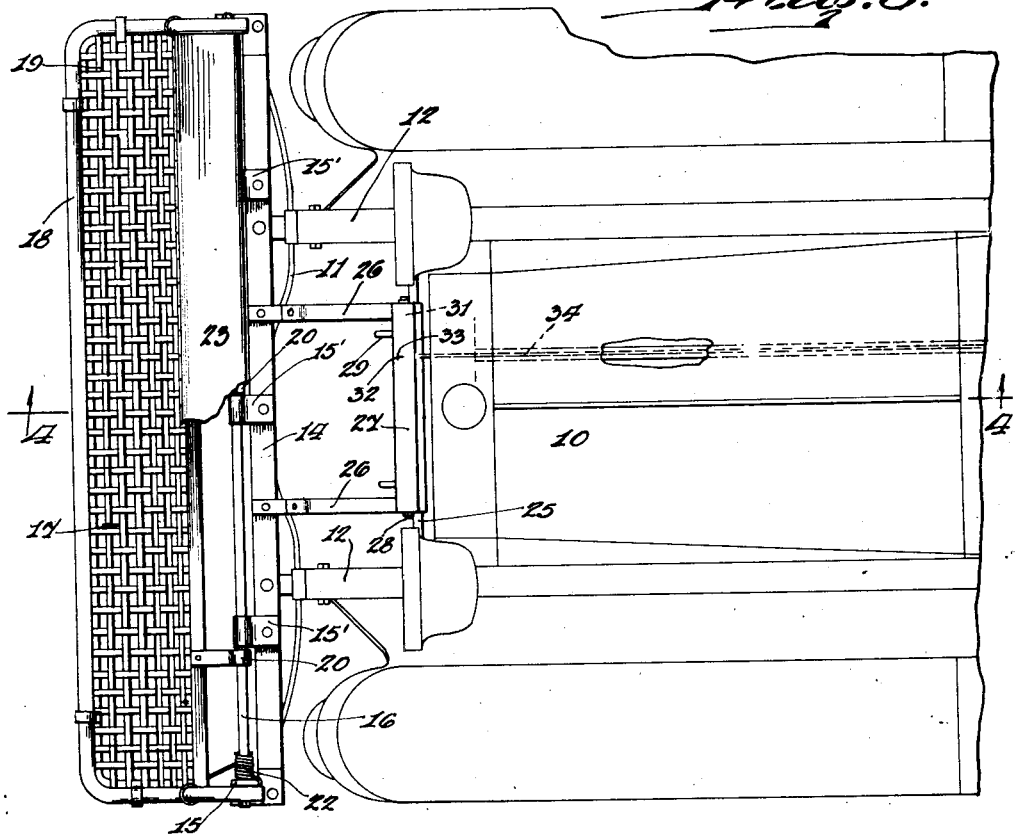
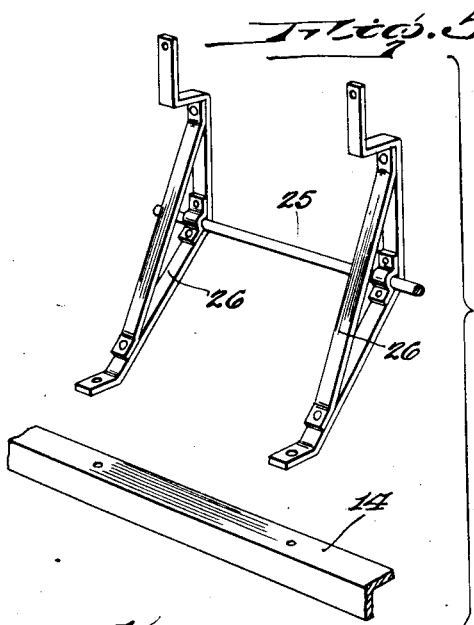
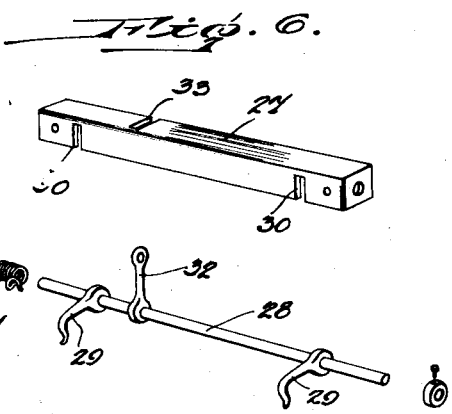
SAMUEL RUBIN,
    INVENTOR
BY Victor J. Evans
    ATTORNEY May 14, 1929.                S. RUBIN                1,713,484
                          AUTOMOBILE FENDER
                  Filed Aug. 3, 1928      3 Sheets-Sheet 3
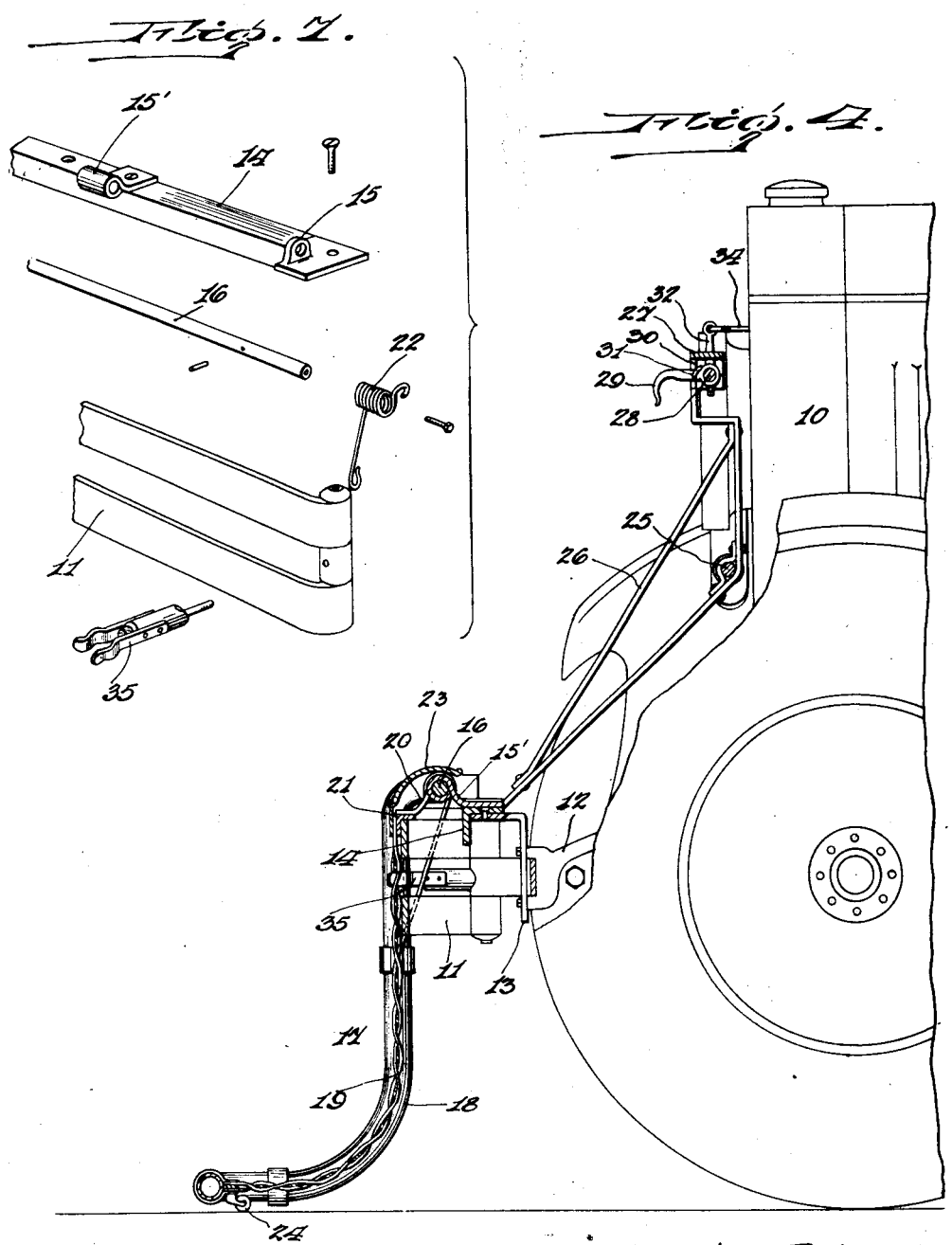
SAMUEL RUBIN
INVENTOR
BY *Victor J. Evans*
ATTORNEY
WITNESS Patented May 14, 1929.

1,713,484

UNITED STATES PATENT OFFICE.

SAMUEL RUBIN, OF BROOKLYN, NEW YORK.

AUTOMOBILE FENDER.

Application filed August 3, 1928. Serial No. 297,258.

This invention relates to automobile fenders and is an improvement over the construction set forth in my prior U. S. Letters-Patent No. 1,647,933, dated November 1, 1927.

The primary object of the invention resides in an automobile fender adapted to be mounted upon and forward of the usual bumper located on the front of an automobile and which is normally held in a raised position for manual release by the driver of the vehicle for automatic dropping to a lowered position in case of emergency, to prevent a person who might be struck from being run over and seriously injured.

Another object of the invention is to simplify the construction of the type of fender shown in the above patent by omitting certain of the details of construction and substituting other construction in lieu thereof which is believed to be more practical and efficient.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevational view of the front end of an automobile provided with my improved safety fender.

Figure 2 is a front elevation of the same.

Figure 3 is a top plan view.

Figure 4 is an enlarged vertical transverse sectional view through the safety fender.

Figures 5, 6 and 7 are collective perspective views of the several working parts of my invention.

Referring to the drawings by reference characters, the numeral 10 designates the front end of an automobile which includes an ordinary type of spring bumper 11 mounted on the front ends of the chassis 12 by means of angular attaching brackets 13. Mounted on the bumper 11 and extending transversely thereof is an angle bar 14 having ears 15 at opposite ends thereof and bearing eyes 15' intermediate the ears 15 and which eyes are disposed in axial alignment with the ears 15 for the purpose of rotatably supporting a transverse shaft 16. Swingingly mounted on the shaft 16 is a fender or scoop 17 which includes a tubular frame 18 which is substantially U-shape in plan and S-shape in cross section. The frame is covered by a mesh facing 19 and is fixedly connected to the opposite ends of the shaft 16 so as to swing therewith. Eyes 20 are carried by a transverse angle bar 21 mounted in the frame and through which the shaft 16 also extends, the eyes 20 being fixedly connected to the shaft for turning movement therewith.

For the purpose of normally tending to swing the frame to a lowered or obstructing position forward of the wheels of the automobile, I provide springs 22 which encircle the ends of the shaft 16 and have one of their ends fixedly connected to the ears and their other ends to the sides of the U-shaped frame. It will be evident that when the frame is swung to a raised position, the springs will be placed under tension and which springs serve to automatically swing the frame to a lowered position upon the actuation of a releasing means which will presently be described. A guard or shield 23 is hingedly connected to the fender and extends over the shaft 16 to conceal the bearing ears and eyes from view. Rollers 24 are provided on the lower end of the frame for engagement with the ground when the fender is in a lowered position and which support the frame in spaced relation with respect to the ground so as to ride freely thereover.

Supported by a transverse brace bar 25 of the automobile are brackets 26 which are also connected to the angle bar 14 for firm mounting and which brackets rise upwardly to a position adjacent the front of the radiator of the vehicle. The tops of the brackets 26 support a transverse angle bar 27 in which a rocker shaft 28 is journalled in the closed ends thereof. The rocker shaft carries hooks or catches 29 which are fixedly connected thereto and which extend through slots 30 provided in the vertical flanges of the angle bar 27 so as to normally extend into the path of the upward swinging movement of the frame 17. A spring 31 is carried by the rocker shaft and tends to normally hold the catches in the position shown in full lines in the several figures of the drawing. Also fixed to the rocker shaft 28 intermediate the catches 29 is an arm 32 which extends through a slot 33 in the horizontal flange of the angle bar 27. The closed end of the slot 33 serves to limit the movement of the arm 32 in one direction which holds the catches 29 in a set position. A cable 34 has one of its ends connected to the arm 32 and its other end leading to a position on the dash board of the automobile or any other suitable place within reach of a driver of the vehicle.

Carried by the ends of the bumper 11 are spring clamps 35, the open jaws of which receive the sides of the frame 17 when dropped to a lowered position and which serve to prevent accidental swinging of the frame when in such position.

In practice, the fender is swung to a raised position as shown in dotted lines in Figure 1 of the drawing whereupon the cable 34 is pulled to lift the catches 29 out of the path of swinging movement of the transverse bar of the frame. When the frame has been fully moved to a raised position, the cable 34 is released and the catches 29 engage the frame and prevent accidental dropping of the same.

In an emergency wherein it appears that a person will be struck by the vehicle, the operator pulls upon the cable 34 to actuate or release the catches 29 from engagement with the frame, at which time the springs 22 which are under tension, automatically move the fender to a lowered position as shown in full lines in the drawings. When the fender reaches its lowered position, the clamps 35 engage the sides of the frame to prevent accidental swinging of the same while the rollers 24 ride over the ground. A person being struck will be caught in the scoop or mesh frame and saved from being run over by the wheels of the vehicle and seriously injured.

Although I have shown a mechanical means for releasing the catches 29, it will be appreciated that electromagnetic means may be employed for imparting a turning movement to the rocker shaft, if desired.

In the present instance, the bumper of the vehicle constitutes a support for the fender but which fender in no way effects the use of the bumper for its bumping purposes as the fender is normally held in a raised position out of the path of any obstacle with which the bumper may come in contact.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In combination with a motor vehicle having a bumper at the front thereof, a mesh frame swingingly mounted thereon, spring actuated catch members mounted in the path of upward movement of said frame for engaging the same to hold said frame in a raised position, spring means acting upon said frame to move the same to a lowered position, and manually operated means for actuating said catch members for releasing said frame from engagement therewith.

2. In combination with a motor vehicle having a bumper at the front thereof, a frame of S-shape configuration in cross section pivoted to said bumper, a mesh facing within said frame, releasable means for holding said frame in a raised set position, spring means acting upon said frame to swing the same to a lowered position, and spring clips carried by said bumper in the path of the sides of said frame for engaging and holding the same against accidental swinging when lowered.

3. In combination with a motor vehicle having a bumper at the front thereof and a transverse brace rod, a mesh frame pivoted to said bumper, spring means acting to move said frame to a lowered position, a supporting bracket fixed to said bumper and brace rod and rising above the latter, a rocker shaft journalled in said bracket, catches on said rocker shaft in the path of upward swinging movement of said frame for engaging the same to hold the frame in a raised position against the action of said spring means, and manually operated means connected with said rocker shaft for releasing said catches to allow said spring means to automatically swing said frame to a lowered position.

In testimony whereof I have affixed my signature.

SAMUEL RUBIN.